W. A. BRUCK.
FOWL CLEANER.
APPLICATION FILED JULY 1, 1920.

1,421,397.  Patented July 4, 1922.

WITNESSES
Guy M. Spring

WILLIAM A. BRUCK   INVENTOR.

BY
Richard B. Owen
ATTORNEY.

UNITED STATES PATENT OFFICE.

WILLIAM A. BRUCK, OF PEARL RIVER, NEW YORK.

FOWL CLEANER.

1,421,397.   Specification of Letters Patent.   Patented July 4, 1922.

Application filed July 1, 1920. Serial No. 393,277.

*To all whom it may concern:*

Be it known that I, WILLIAM A. BRUCK, a citizen of the United States, residing at Pearl River, in the county of Rockland and State of New York, have invented certain new and useful Improvements in Fowl Cleaners, of which the following is a specification.

This invention relates to fowl or poultry cleaners designed for removing the intestines, lungs, heart and other internals of the fowl which are usually removed when dressing the fowl for cooking purposes, the primary object of the invention being to provide such a device as will eliminate the necessity of the chef extending the hand or fingers into the body of the fowl to remove the desired parts.

An important object of the invention is to provide a cleaner having a cutting edge cooperating with a plurality of teeth or fingers so that certain organs of the fowl may be easily and readily removed, the cooperating teeth and cutting edge both entering into use at the same time during the removal of these organs.

Another object of the invention is to provide a cleaner having a notch or slot in one end thereof to provide a pair of spaced teeth or fingers which are adapted to straddle the back bone of the fowl when the tool is being drawn outwardly of the body of the fowl when removing the intestines, egg growth and other tissues which are desirable to remove.

Still another object of the invention is to provide a cleaner of the above mentioned character which is formed or stamped out of a single piece of material and is perfectly flat when completed, thereby obviating the necessity of bending any parts to provide the finished article.

A further object of the invention is to provide a device of the above nature which is strong, durable, inexpensive to manufacture and a highly desirable device to have handy around the kitchen.

Other objects and advantages will become apparent during the course of the following description.

In the accompanying drawings forming a part of the application and wherein like numerals are employed to designate like parts throughout the several views, Figure 1 is a plan of the invention.

Figure 1:
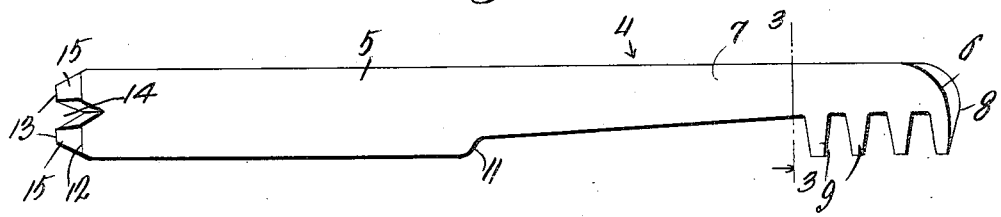
Figure 2:
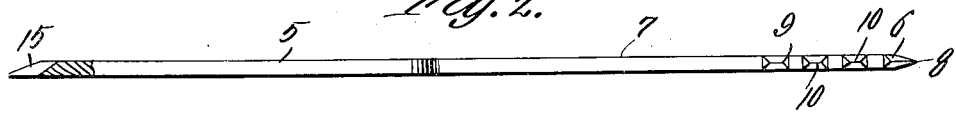
Figure 2 is an edge view of the same with a part thereof broken away.
Figure 3:
Figure 3 is a transverse section through the cleaner taken on the line 3—3 of Figure 1.

Referring to the drawings, wherein for the purpose of illustration is shown the preferred embodiment of my invention, the numeral 4 designates the cleaner in its entirety and which consists of an elongated flat piece of metal, approximately one half 5 of the strip of metal having its longitudinal edges paralleling each other and forming a handle portion when one end of the tool is being used. The free transverse end of what I term as a blade portion 7 is arcuated or convexed outwardly as clearly shown in Figure 1 and opposite side edges of the end 6 are reduced by filing or grinding to provide a transverse end 6 with an arcuated cutting edge 8 as more clearly shown in Figure 2. One longitudinal edge of the tool or blade portion 7 is provided adjacent the transverse end 6 with a plurality of laterally projecting spaced teeth or fingers 9. These teeth are arranged on the same plane with the blade portion and opposite sides thereof are ground or tapered down to their free ends to provide the free ends of the teeth with cutting edges 10 as clearly shown in Fig. 2. It is to be noted that the free ends of the teeth 9 do not taper into points, but are provided with the cutting edges 10 as clearly shown in the drawings. It is to be borne in mind that the teeth 9 are arranged in very close proximity to the cutting edge 8, and in fact one edge of the outermost tooth 9 is provided by the end 6 of the blade portion so that the teeth and cutting edge may properly cooperate or perform their functions when the tool is being manipulated to remove certain organs of the fowl. The longitudinal edge of the blade portion opposite the edge upon which the teeth 9 are arranged, is preferably straight and is a continuation of one edge of the handle portion 5. However, the opposite longitudinal edge of the blade portion inclines from the lower end of the innermost tooth toward the handle portion 5 to form the blade portion into an outwardly tapering portion and to merge into a shoulder 11 at the inner end of one longitudinal edge of the handle portion 5. The opposite end of the cleaner or tool is beveled on one side thereof as at 12 to provide a transverse edge of the tool with a cutting edge 13. An inwardly extending V-shaped notch is provided in this transverse end of the tool to provide the end with a pair of spaced teeth or fingers 15 the free ends of which are provided with cutting or sharpened edges by the transverse edge 13.

In order to clean a fowl, the vent is first removed, after which an incision is made on the breast side at the junction of the neck and breast so that the craw or feed crop may be removed. After the craw has been dispensed with, my improved tool is grasped by the handle portion 5 in one hand while the other hand is employed to hold the fowl firmly upon the table. With the teeth 9 projecting downwardly toward the table, the tool is moved so as to pass the blade portion and teeth 9 inwardly through the incision provided to remove the craw. The tool is moved into the incision about two inches, then downward so that the teeth 9 go down between the ribs of the fowl close to the back bone so that the teeth may engage the lung. The tool is then pushed so that the teeth 9 move downwardly close to the back bone, after which the tool is turned so as to move the teeth outwardly and upwardly of the back bone, and at the same time the tool is moved slightly inward of the fowl so that the cutting edge may cut away any tissues which tend to resist the removal of the lung. When it is deemed that the lungs have been sufficiently loosened, the tool is turned around about three quarters of a turn so that the teeth 9 move upwardly and the tool is given a quick jerk outwardly through the incision and pull with it the lung which has been entangled in the teeth 9 and at times the heart of the fowl is also drawn out together with the lungs. The same operation is performed on the other side of the back bone to remove the other lung and after these organs have been removed the fowl is turned around so that the intestines and other organs may be removed from the rear end thereof.

The opposite end of the tool is then adapted to be brought into operation, and the cleaner is gripped upon the blade portion thereof. The end of the tool having the pair of fingers 15 is then inserted into the rear end of the body of the fowl with the beveled portions of the fingers arranged on top. The tool is then moved inwardly into the body of the chicken between the breast bone and the intestines, and worked therebetween until the free end of the tool engages the back bone of the fowl at the forward end of its body. The tool is then moved from side to side until the back bone of the fowl is received in the notch 14 and the fingers 15 straddle the same. The tool is then moved outwardly of the body and carries with it all the intestines and organs which are usually removed when the fowl is cleaned.

However, oftentimes clots of blood and egg growth are lodged firmly between the ribs of the fowl adjacent the back bone and if the egg growth and the blood clots are not removed with the rest of the intestines, the blade portion 7 may be inserted into the rear of the body so that the teeth 9 will be forced down between the ribs and in contact with the back bone. The tool is then turned to cause the teeth 9 to move towards the side of the fowl so as to remove the egg growth and blood clots from between the ribs. The cutting edge 8 will also be found convenient when using the tool for cutting away any tissues which have been pulled away from the intestines during their withdrawal.

The foregoing description and the accompanying drawings have reference to the preferred or approved embodiment of my invention. It is to be understood however that such changes may be made in construction and arrangement of parts, materials, dimensions, etc., as may prove expedient and fall within the scope of the appended claims.

Having thus fully described my invention what I claim as new and desire to secure by Letters Patent is:—

1. A fowl cleaning tool comprising an elongated relatively narrow blade having a plurality of teeth projecting from a longitudinal edge thereof adjacent its forward free transverse end, said transverse end being arranged at a substantially abrupt angle to the longitudinal axis of the blade, and said transverse end being sharpened into a cutting edge.

2. A fowl cleaner comprising an elongated blade having a plurality of teeth projecting from one longitudinal edge thereof adjacent its forward free transverse edge, said transverse edge being arranged a substantially abrupt angle to the longitudinal axis of the blade, the other longitudinal edge of the blade adjacent its free transverse edge being curved to merge into said transverse edge, and said curved portion and the edge of the transverse free end being sharpened into a cutting edge.

In testimony whereof I affix my signature in presence of two witnesses.

WILLIAM A. BRUCK.

Witnesses:
 LENA MARTIN.
 GERMAIN MARTIN.